United States Patent
Sodemann et al.

(10) Patent No.: US 7,053,497 B2
(45) Date of Patent: May 30, 2006

(54) MONITORING SYSTEM FOR A GENERATOR

(75) Inventors: Wesley C. Sodemann, Dousman, WI (US); Kenny J. Stair, North Prairie, WI (US); Russell C. Nordman, Sussex, WI (US); Paul A. Tharman, Pewaukee, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 0 days.

(21) Appl. No.: 10/773,510

(22) Filed: Feb. 6, 2004

(65) Prior Publication Data

US 2004/0155466 A1 Aug. 12, 2004

Related U.S. Application Data

(60) Provisional application No. 60/446,136, filed on Feb. 10, 2003.

(51) Int. Cl.
*H02K 5/00* (2006.01)
(52) U.S. Cl. .............. 290/1 A; 290/40 R; 290/44; 290/59; 290/28; 290/46; 290/32; 290/40 B
(58) Field of Classification Search .......... 290/40, 290/1 A, 44, 59, 28, 46, 32, 40 B, 40 R
See application file for complete search history.

(56) References Cited

U.S. PATENT DOCUMENTS

| | | |
|---|---|---|
| 4,595,841 A | 6/1986 | Yaguchi |
| 4,622,923 A | 11/1986 | Nishimura et al. |
| 4,658,213 A | 4/1987 | Finley |
| 4,721,070 A | 1/1988 | Tanaka et al. |
| 4,798,082 A * | 1/1989 | Fujikawa et al. .......... 73/117.3 |
| 4,937,561 A | 6/1990 | Sasaki et al. |
| 5,144,232 A | 9/1992 | Veenstra |
| 5,146,416 A | 9/1992 | Kuo |
| 5,317,999 A | 6/1994 | Kern et al. |
| 5,353,762 A | 10/1994 | Dykstra et al. |
| 5,376,877 A | 12/1994 | Kern et al. |
| 5,416,416 A | 5/1995 | Bisher |
| 5,497,735 A | 3/1996 | Kern et al. |
| 5,504,417 A | 4/1996 | Kern et al. |
| 5,521,486 A | 5/1996 | Takamoto et al. |
| 5,555,853 A | 9/1996 | Bowen et al. |
| 5,625,276 A | 4/1997 | Scott et al. |
| 5,684,718 A | 11/1997 | Jenkins et al. |
| 5,705,917 A | 1/1998 | Scott et al. |
| 5,726,911 A | 3/1998 | Canada et al. |
| 5,886,504 A | 3/1999 | Scott et al. |
| 5,900,722 A | 5/1999 | Scott et al. |
| 5,929,611 A | 7/1999 | Scott et al. |
| 5,949,247 A | 9/1999 | Lima et al. |
| 5,977,647 A | 11/1999 | Lenz et al. |
| 6,018,200 A | 1/2000 | Anderson et al. |
| D420,607 S | 2/2000 | Wrisley et al. |

(Continued)

FOREIGN PATENT DOCUMENTS

DE 199 07 606 8/2000

(Continued)

*Primary Examiner*—Darren Schuberg
*Assistant Examiner*—Iraj A. Mohandesi
(74) *Attorney, Agent, or Firm*—Michael Best & Friedrich, LLP

(57) ABSTRACT

A load monitoring apparatus for monitoring the load applied to a portable generator. The apparatus includes a sensor, and a humanly perceptible indicator that indicates at least one discontinuous load power frequency.

17 Claims, 9 Drawing Sheets

U.S. PATENT DOCUMENTS

| | | | |
|---|---|---|---|
| 6,034,511 A | 3/2000 | Scott et al. | |
| D423,383 S | 4/2000 | Fernandez et al. | |
| 6,067,945 A | 5/2000 | Fukuda et al. | |
| 6,084,313 A * | 7/2000 | Frank | 290/40 C |
| 6,118,186 A | 9/2000 | Scott et al. | |
| 6,172,428 B1 * | 1/2001 | Jordan | 290/40 C |
| 6,181,019 B1 | 1/2001 | Frank | |
| 6,297,742 B1 | 10/2001 | Canada et al. | |
| 6,310,404 B1 * | 10/2001 | Frank | 290/1 A |
| 6,313,543 B1 * | 11/2001 | Frank | 290/1 A |
| D453,481 S | 2/2002 | Schoenfish | |
| 6,362,533 B1 | 3/2002 | Morohoshi et al. | |
| D455,665 S | 4/2002 | Schoenfish et al. | |
| 6,365,982 B1 | 4/2002 | Iles et al. | |
| D460,703 S | 7/2002 | Wrisley et al. | |
| 6,434,512 B1 | 8/2002 | Discenzo | |
| 6,441,505 B1 | 8/2002 | Poletti et al. | |
| 6,445,287 B1 | 9/2002 | Schofield et al. | |
| 6,525,430 B1 * | 2/2003 | Asai et al. | 290/1 A |
| 6,541,718 B1 | 4/2003 | Burkholder et al. | |
| 6,542,074 B1 | 4/2003 | Tharman et al. | |

FOREIGN PATENT DOCUMENTS

| | | |
|---|---|---|
| GB | 1 296 220 | 11/1972 |
| GB | 2 264 825 | 9/1993 |

\* cited by examiner

MONITORING SYSTEM FOR A GENERATOR

RELATED APPLICATION

This application claims the benefit of provisional application No. 60/446,136 filed on Feb. 10, 2003.

BACKGROUND OF THE INVENTION

The invention relates to load sensing and monitoring devices for use with power generators, and in particular, for use with portable power generators.

Known portable power generators generally include an outlet panel so that the user can plug electrical devices into the generator such that the power generated can be transferred to the electrical devices. Plugging too many devices into the generator at the same time can cause overloading. Overloading of the generator can cause significant problems. For example, if the load on the generator gets too high, the overload can cause an undervoltage condition that may cause the motor speed to be reduced and in extreme cases, cause the motor to burn out.

SUMMARY OF THE INVENTION

In some aspects, the load monitoring device of the invention includes a printed circuit board or other circuit, the circuit including a sensing device for sensing the total load applied to the generator. In one embodiment, total applied load is determined based upon sensing a signal supplied to the load such as the change in the frequency of the output signal. In other embodiments, the total load is determined by sensing the output voltage or output current drawn by the total load. The load monitoring device further includes a load display indicator to inform the user of the load on the generator. In one aspect of the invention, the load display indicator includes a series of light emitting diodes ("LED's"), incandescent, or other lights, or a liquid crystal display ("LCD") to indicate the load on the generator. These lights or displays provide readily understood discrete or discontinuous indications of a generator capacity being used. In another aspect of the invention, the LED or other lights may be color-coded. In yet another aspect of the invention, the load display indicator includes a separate warning light to indicate that the generator is overloaded.

In another embodiment of the invention, the load monitoring device also includes a maintenance monitoring device. The maintenance monitoring device includes indicators to inform the user when to perform standard maintenance on the generator (i.e. when to change the oil, when to change the air filter). The maintenance monitoring device further includes a reset button to reset the maintenance monitoring system. In another aspect of the invention, the maintenance monitoring indicators are LED or other lights. In yet another aspect of the invention, the LED or other lights are color-coded. In a further aspect of the invention, the maintenance monitoring device also includes an hour meter.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
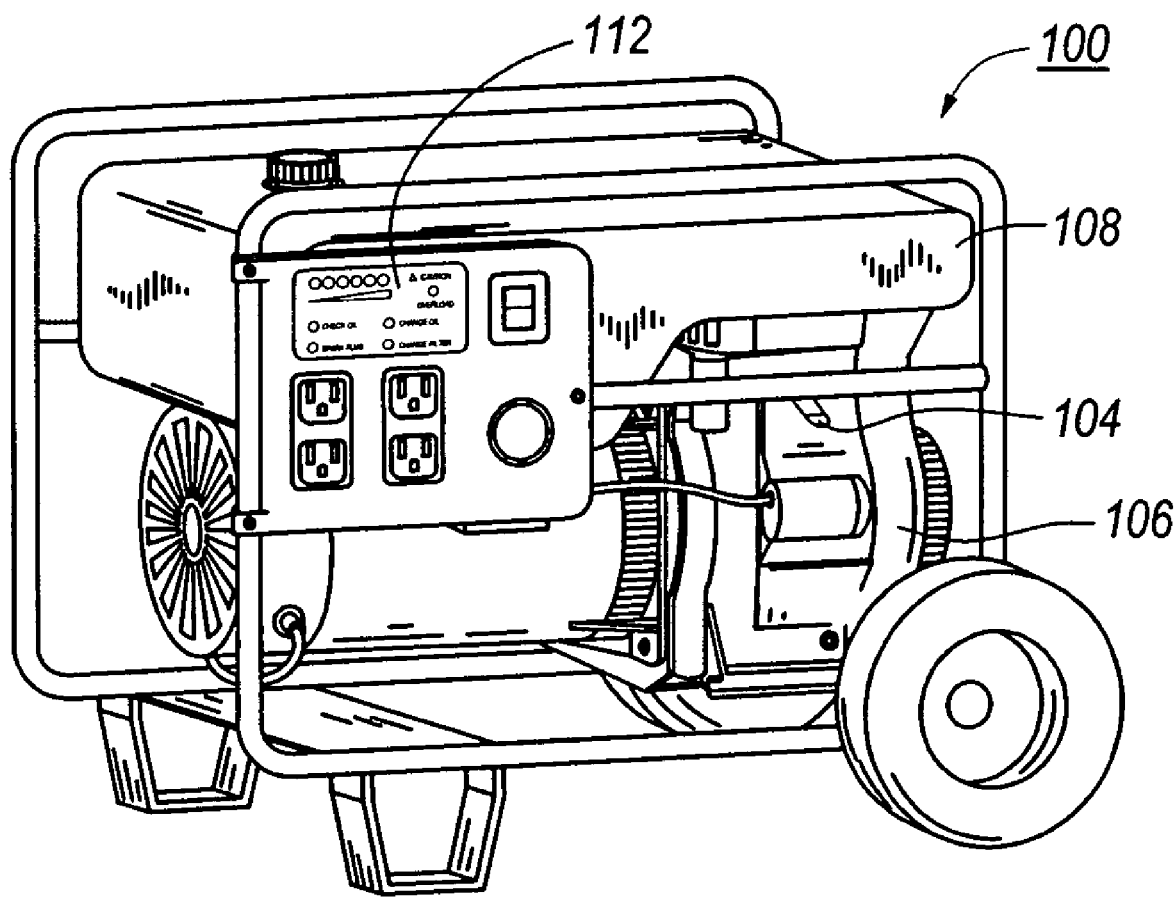
FIG. 1 shows a perspective view of a portable generator according to the invention.

FIG. 1 shows a perspective view of a portable generator 100 with an engine 106. In the embodiment, the generator 100 has a generator housing 108, and integrates a load monitoring apparatus or device 112 thereon. Although the load monitoring apparatus 112 is mounted on the side panel of the generator 100, other parts of the generator 100 such as a control panel area of the generator 100 can be used to house the load monitoring apparatus 112. Furthermore, the load monitoring apparatus 112 is configured to monitor and display the output of the generator 100 using a variety of power related parameters such as frequency of power generated or power supplied by the generator to an attached load. However, one skilled in the art would understand that other power related parameters such as voltage or current supplied to the load can also be used as indicators of the generator output.

Figure 2:
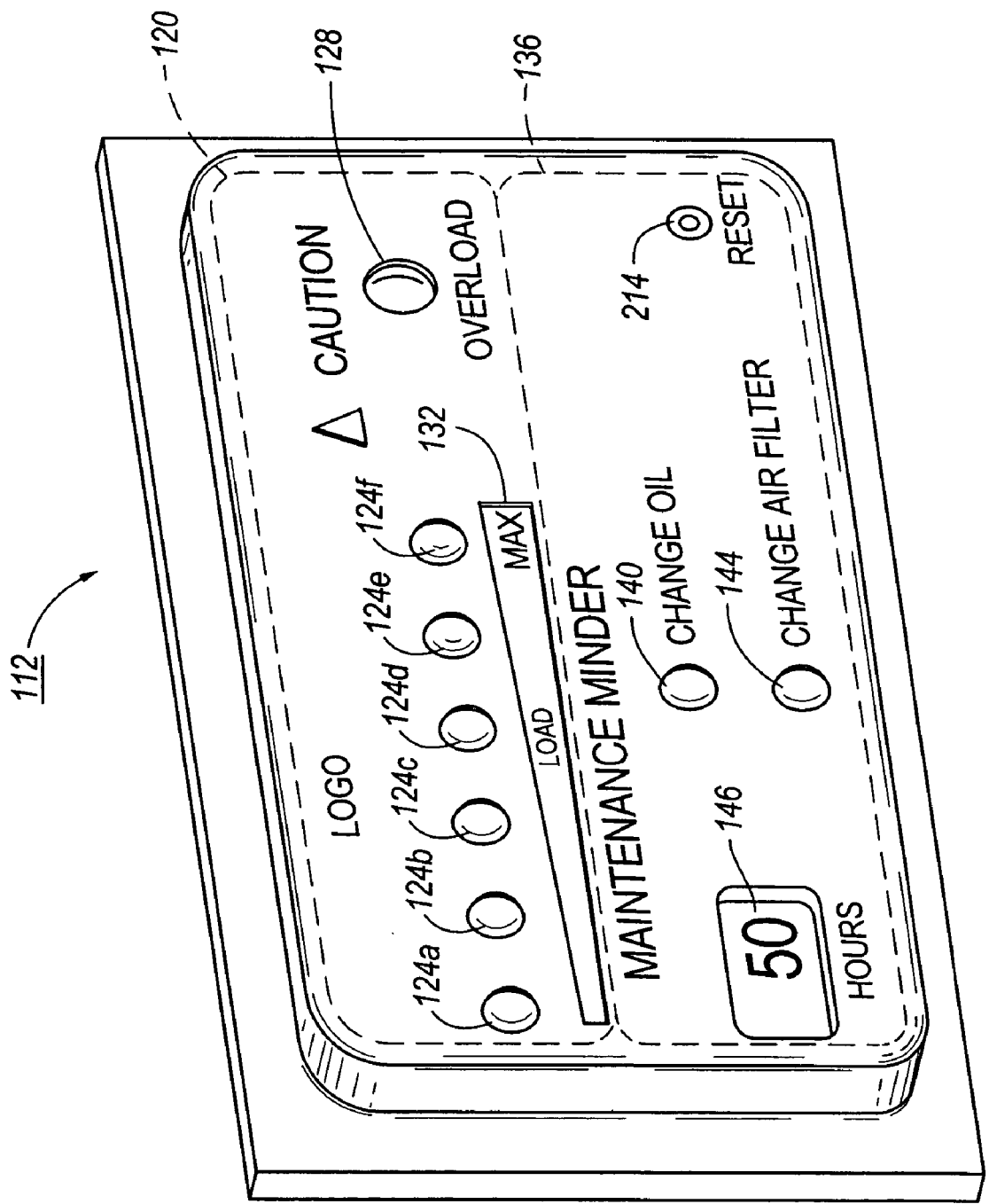
FIG. 2 is a front view of a load monitoring apparatus embodying the invention.

The load monitoring apparatus 112, as shown in FIG. 2, generally includes a variety of displays to indicate various functions or operating status of the generator 100 when a load is applied. For example, the load monitoring apparatus 112 includes a load indicator 120 that includes humanly perceptible indicators such as a series of light-emitting diodes ("LED's") 124a–124f to indicate whether the load applied on the generator 100 is within the normal operating parameters of the generator 100. For example, the series of LED's 124a–124f includes a series of four green LED's 124a–124d and a series of two yellow LED's 124e–124f. The green LED's 124a–124d are used to indicate when the generator 100 is operating efficiently or within normal operating parameters, whereas the yellow LED's 124e, 124f are used to indicate if the generator 100 is operating at or close to maximum capacity. Specifically, when at least one of the LED's 124a–124f is lit, each LED will represent a discrete or discontinuous percentage of generator capacity being used as detailed hereinafter.

In addition, the load indicator 120 also includes an individual warning light or overload status LED 128 to indicate when the portable generator 100 is overloaded. When activated, the regular LED's 124a–124f and the overload LED 128 will light up or flash. Although green and yellow LED's are used for normal load indication and red LED is used for the overload status LED in the embodiment, other LED colors can also be used. Further, other number of LED's can also be used. Of course, other light sources could be used as indicators and, alternatively, the load monitoring apparatus 112 may utilize an audible or any humanly perceptible indicator. Although FIG. 2 shows that the overload indicator 128 is spaced apart from and is larger than the series of green and yellow LED's 124a–124f, the overload indicator 128 can also be positioned next to the LED 124f and can have a same indicator size. In one embodiment, the warning light or the overload status LED 128 flashes when a total load on the generator 100 exceeds a maximum load, as indicated by an output frequency below about 56.5 Hz.

Furthermore, the load indicator 120 employs an LED color coding scheme that makes for a simple scale for a user or an operator of the generator 100 to understand. The color coding also makes the scale easy to read from a distance. When the user plugs in a load so that it is drawing power from the generator 100, the LED's 124a–124f, 128 will light up depending on a magnitude of the total applied load. The user knows that when the green LED's 124a–124d light up, the total load level is within acceptable parameters and the user is free to apply another reasonably-sized load to the generator 100. When the yellow LED's 124e, 124f are lit, the user should exercise caution if additional loads are desired which will increase the total applied load on the generator 100. When the red warning light or the overload LED 128 appears, the user should disconnect one or more loads until the red light 128 goes off and the last yellow light 124f appears, to keep the generator 100 functioning within desired parameters.

To further increase the ease of comprehension of the information displayed by the load monitoring apparatus 112, the load monitoring apparatus 112 also includes a wedge 132 that runs horizontally along the bottom side of the LED's 124a–124f. The wedge 132 is narrower under the minimum load value LED 124a and gets continuously wider to the maximum load LED 124f. This again reinforces that as LED's 124a–124f are illuminated from the first green LED 124a through to the last yellow LED 124f, the applied load increases from a minimum value to a maximum value. In other embodiments, the device may also include color shading behind the LED's that corresponds to the color of the LED's varying from light to dark as another indicator that moving from left to right along the device indicates a minimum to maximum load.

Optionally, also as shown in FIG. 2, the load monitoring apparatus 112 may include a maintenance status indicator 136 to indicate the general maintenance status of the portable generator 100 to indicate to the user when to perform regular maintenance on the generator 100. For example, the maintenance status indicator 132 includes a "change oil" indicator 140 to indicate a generator oil status, a "change air filter" indicator 144 to indicate a generator air filter status, and a hour meter 146 to display the running hours of the generator 100 since a reset. When any of the status indicators is activated or lit, respective maintenance may be due. It would be appreciated that other indicators can be added to the monitoring apparatus to indicate other parameters of the generator. Again, although LED's are used to indicate the status of the generator 100, other types of indicators can also be used. For example, the status indicators can be audible indicators, or any humanly perceptible indicators can also be used. The maintenance indicators 140 and 144 are activated by an internal clock in the generator 100 based on the total number of hours that the generator 100 has been in use. One embodiment of the maintenance monitoring device 112 is disclosed and described in U.S. Pat. No. 6,542,074 issued Apr. 1, 2003, the entire contents of which is incorporated by reference herein.

As described earlier, the load monitoring apparatus 112 is configured to monitor and display a usage capacity of the generator 100 using a variety of power related parameters such as frequency of power generated or power supplied by the generator to an attached load. There are various techniques to measure a load power frequency. For example, the load power frequency is measured by monitoring the voltage of the output of the generator 100. Since the voltage reading is generally sinusoidal, counting the sine waveforms of the voltage, or more specifically zero crossings of the sine waveforms, will give a voltage frequency at the output of the generator.

Figure 3:
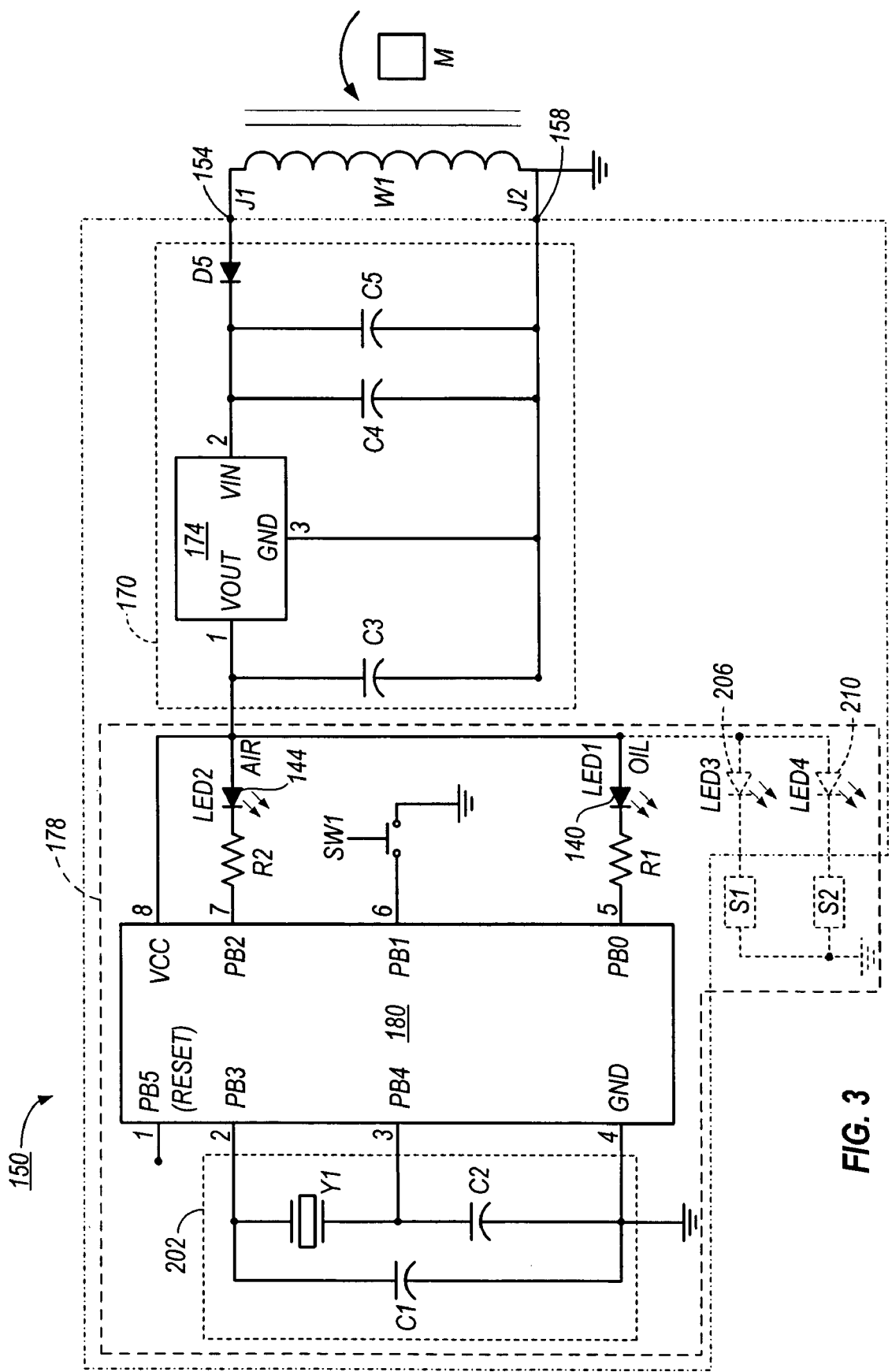
FIG. 3 shows an electrical schematic of a maintenance monitoring circuit of the load monitoring apparatus of FIG. 1 embodying the invention.

Measuring frequency of other waveforms such as signal waveforms at a winding of the generator 100 can also be used. For example, FIG. 3 shows a maintenance monitoring sensor or circuit 150 of the load monitoring apparatus 112. In FIG. 3, the monitoring circuit 150 includes a winding W1 disposed on an engine ignition coil frame of the internal combustion engine 106 that is part of the generator 100. The winding W1 is preferably the ignition coil, however the winding W1 can be a stand-alone winding. The maintenance monitoring sensor is generally magnetically coupled to a flywheel of the engine 106. Particularly, the flywheel of the engine 106 has a magnet M. When the magnet M rotates, the magnet M interacts with winding W1 to generate a signal. Since the frequency at which the flywheel rotates (revolutions per minute or RPM) has the same value as the load power frequency, the load monitoring apparatus 112 may also measure the frequency of the rotating flywheel by counting the zero crossings of the signal generated by the magnet M.

In yet another embodiment, the load monitoring apparatus can be configured to monitor the magnitude of current at the generator output. Generally, the engine 106 of the generator 100 is set to a fixed speed to provide consistent power to an applied load. The speed of the engine 106 in the generator 100 is typically set to rotate at a rate of 60 cycles/second, or 3600 RPM. Under a no load or light load condition, the speed can increase to about 62 cycles/second, or 3720 RPM. When a load is applied, the speed of the engine 106 droops (at the maximum load, the speed droops to about 57 cycles/second, or 3420 RPM). By placing a current transformer, i.e. a coil, on a line running from the magnet M, the current running through the line will generate a signal in the current transformer. The current is proportional to the engine speed and thus can be used to measure the frequency of the load.

Particularly, a typical 120/240-Volt portable power generator has a desired frequency ranging between about 57 Hz and 62 Hz (or about 48–52 Hz for a typical European 220-Volt portable power generator), which is also indicative of a maximum and a minimum load levels of the generator. The amount of load power drawn out of the generator 100 varies depending on the power or wattage of the load that is plugged into the generator 100. For example, a 1200-Watt appliance or load will draw more power than a 700-Watt load. When a total load drawn from the generator 100 exceeds the maximum level, the generator 100 is overloaded, problems can occur, and the overload indicator 128 is activated. More specifically, an overloaded generator, can slow down a load motor or the engine 106 generating the power, thus reducing the effectiveness of the load. In more extreme cases, overload can cause the load motor to burn out.

Figure 4:
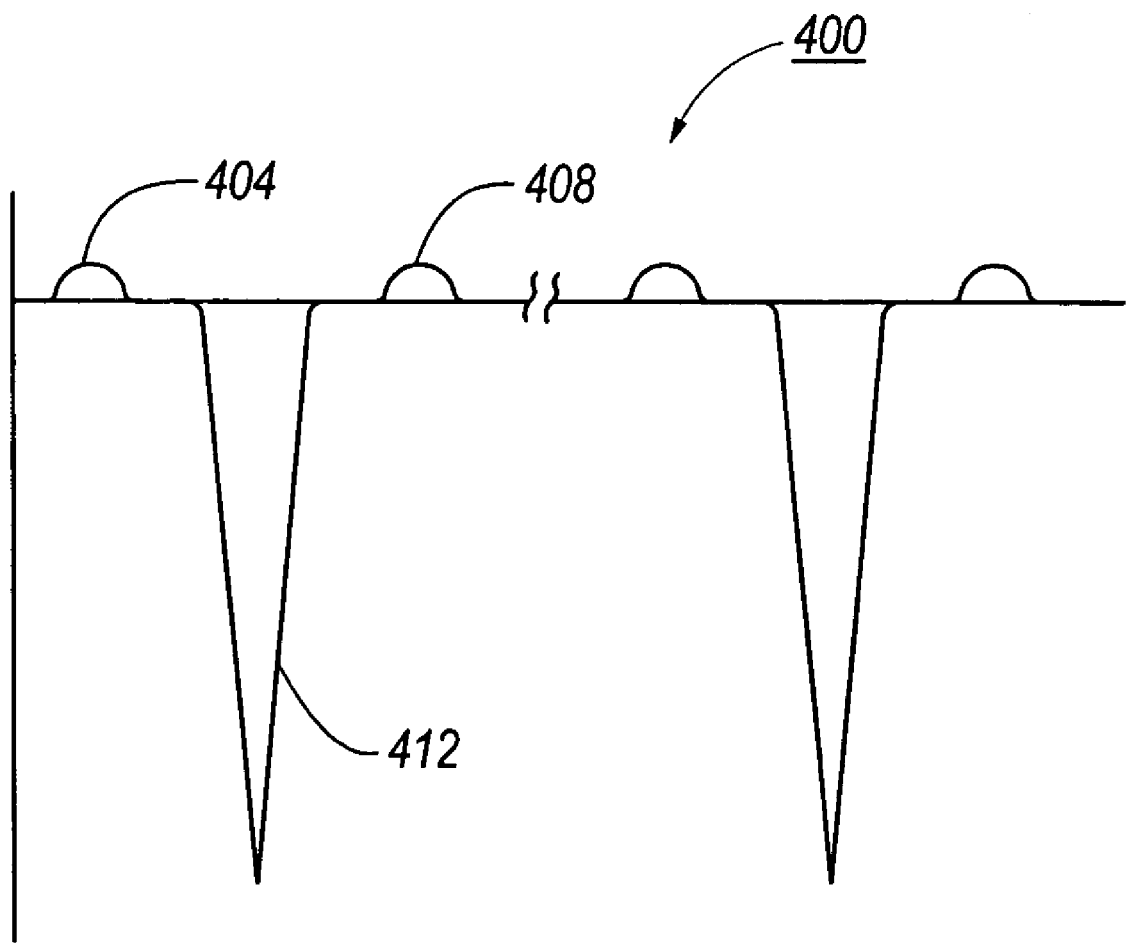
FIG. 4 shows an exemplary winding signal being generated in a winding.

Referring back to FIG. 3, the maintenance monitoring sensor 150 is electrically coupled to the load monitoring apparatus 112 of FIG. 2. The maintenance monitoring sensor includes the winding W1 that generates a winding voltage signal having a winding voltage waveform 400 as shown in FIG. 4 when the magnet M and thus the flywheel rotate. The voltage waveform 400 is generated each time flywheel magnet M passes the winding W1. The voltage waveform 600 typically has leading and trailing quarter-cycles 404, 408 of one polarity, and a center half-cycle 412 of the opposite polarity. The center half-cycle 412 of waveform has a significantly higher amplitude than the leading and trailing half-cycles 404, 408, and is used for engine ignition. The positive-going quarter-cycles 404, 408 may be used to power the load monitoring apparatus 112. If the power provided during these quarter-cycles is insufficient to operate the load monitoring apparatus 112, either the large center half-cycle 412, a battery, or rectified generator output power may be used.

The maintenance monitoring sensor 150 also includes a plurality of leads 154, 158. The leads are connected to respective ends of the winding W1 and provide a winding signal to the maintenance monitoring sensor 150. While the maintenance monitoring sensor 150 can be incorporated into an instrument panel such as the load monitoring apparatus 112, the maintenance monitoring sensor 150 can also be housed in other parts of the generator 100 such as the engine housing 108. Alternatively, the maintenance monitoring sensor 150 may be a stand-alone detachable module having an individual housing, detailed hereinafter. The maintenance monitoring sensor 150 also incorporates the change oil indicator 140 and the change air filter 144 indicator of FIG. 2 for informing an operator to perform engine maintenance when either of the indicators 140, 144 is activated or lit.

Specifically, the maintenance monitoring sensor 150 includes a conditioner 170 to condition the winding signal and generates a conditioned signal. To condition the winding signal, the conditioner primarily includes a rectifying circuit that has a diode D5 connected in series with capacitors C4 and C5. The rectifying circuit may have a resistor connected in parallel with the capacitors C4 and C5. The conditioner 170 also includes a voltage regulator 174, and a capacitor C3. The voltage regulator 174 is preferably a Motorola LM3480IM3.3 integrated circuit. More specifically, the rectifying circuit rectifies the winding signal into a substantially direct current ("DC") signal having a DC offset with an AC ripple. The substantially DC signal is then provided to the voltage regulator 174, which regulates the substantially DC signal to a 5-volt DC signal. Capacitor C3 is connected to the output of voltage regulator 174 and filters the 5-volt DC signal. Although the conditioner 170 is shown as being internal to the maintenance monitoring sensor 150, the conditioner 170 can also be located external to the maintenance sensor 150.

The maintenance monitoring sensor 150 also includes a counter circuit 178. In the embodiment, the counter circuit 178 also includes a micro-controller 182 that is powered by the conditioned signal at VCC (pin 8) and outputs an indicator signal at PB0 (pin 5) or PB2 (pin 7) when engine maintenance is recommended. Alternatively, the micro-controller 182 may output an indicator signal used for an incremental counter (e.g., the hour meter 146 of FIG. 2). The micro-controller 182 also receives a reset signal when an indicator signal is generated at PB0 (pin 5) or PB2 (pin 7), and when the reset button is depressed. Although FIG. 3 shows the counter circuit 178 being internal to the maintenance sensor 150, the counter circuit 170 can be located external to the maintenance sensor 150.

Furthermore, the micro-controller 182 includes an internal memory, and an input/output (I/O) interface. The internal memory generally includes a nonvolatile memory, such as EEPROM memory or flash memory, and a program memory. The micro-controller 182 implements a software program stored in the program memory. An exemplary software program is a counting or clocking program that counts or clocks an amount of time during which the micro-controller 182 receives the conditioned signal. Using the I/O interface, the micro-controller 182 controls inputs received by and outputs generated to external circuitry of the counter circuit. In the maintenance monitoring sensor 150, the micro-controller 182 may be implemented on an Atmel ATtiny12L-4S or comparable chip. In such a case, the micro-controller 182 will implement a timer that is capable of counting or clocking the amount of time the micro-controller 182 receives the conditioned signal. Of course, other counter circuits or counting devices can be used. When both the maintenance monitoring sensor 150 and a load indicator circuit are implemented, the micro-controller 182 may be implemented on an ST7FLITE09 micro-controller from STMicroprocessors or similar processor, detailed hereinafter.

The maintenance monitoring sensor 150 also includes a first light-emitting diode LED1 140 and a second light-emitting diode LED2 144. In the embodiment illustrated in FIG. 2, LED1 140 and LED2 144 are a different color than the green/yellow LED's 124a–124f of the load indicators, such as orange. Both the first and second light-emitting diodes LED1 and LED2 140, 144 are connected to the micro-controller 182. The first light-emitting diode LED1 140 provides the light source for the change oil indicator 140, and the second light-emitting diode LED2 144 provides the light source for the change air filter indicator 144. Of course, other light sources can be used for the indicators and, alternatively, the indicators may be an audible indicator or a counting device (e.g., an hour meter). Even further, the maintenance sensor 150 may include LED drivers and/or resistors (e.g., resistors R1 and R2) for controlling the voltage being provided to the light-emitting diodes LED1 140 and LED2 144. The maintenance sensor 150 further includes an oscillator serving 202 as a clock for the micro-controller 182.

It is understood by one of skilled in the art that additional LED's could be used to indicate when other types of maintenance status. For example, as shown in phantom in FIG. 3, the load monitoring apparatus 112 may further include a first sensor S1 and a third light-emitting diode LED3 206 connected in circuit with the conditioner 170, and a second sensor S2 and a fourth light-emitting diode LED4 210 connected in circuit with the conditioner 170. In one embodiment, the first sensor S1 is a low-oil pressure sensor that senses a low-oil pressure condition, and the third LED LED3 206 provides a light source for a low-oil pressure indicator. The second sensor S2 is a high-engine temperature sensor that senses a high-engine temperature condition, and the fourth light-emitting diode LED4 210 provides a light source for a high-engine temperature condition indicator. The low-oil pressure sensor S1 and the high-engine temperature sensor S2 are known in the art and, thus, will not be discussed in greater detail. Of course, other sensors and light-emitting diodes can be used or added.

In operation, the magnet M interacts with the winding W1 to generate the winding waveform 400 of FIG. 4. The winding waveform 400 is generated each time magnet M passes winding W1. The winding signal is provided from the winding W1 to the maintenance sensor 150 via the leads 154, 158. Once the maintenance sensor 150 receives the winding signal, the signal is provided to the conditioning circuit 170. The conditioning circuit 170 conditions the winding signal, resulting in a conditioned signal. The conditioned signal is preferably a 5-volt DC signal. Once the engine 106 has properly started, the conditioned signal has a sufficient DC voltage to power the micro-controller 182.

The resulting conditioned signal then powers the counter circuit 178 via VCC (pin 8). Upon receiving the conditioned signal, the micro-controller 182 initiates a stored software program for counting or clocking an amount of time when the micro-controller 182 is active. For example, in one embodiment, the micro-controller 182 first boots-up and obtains from the program memory 198 a software program for execution. While executing the software program, the micro-controller 182 obtains a latest counted number from the nonvolatile memory 194 (e.g., 0000000000000000). The micro-controller 182 then periodically records an incremented new value (e.g., 0000000000000001) in the nonvolatile memory 194. For example, the micro-controller 182 may increment the new value every six seconds. After recording the new value, the software compares the newly recorded value with a stored time period value (e.g., 0111010100110000, which represents 50 hours when starting from 0000000000000000 and using six-second increments). If the newly recorded value is equal to the time period value, then the software records a maintenance recommended state (e.g., change air-filter or change engine oil). The maintenance recommended state results in one of the light-emitting diodes LED1 140 or LED2 144 activating (e.g., LED1 "lights"). For example, the micro-controller 182 applies a low or zero logic value to pin 7 resulting in a current flow from the conditioner 170 through light-emitting diode LED1 140 and resistor R1. After the engine 106 is turned off, the operator can then perform the suggested maintenance (e.g., change the engine oil). Of course, each engine maintenance condition may have a separate time period between recommended maintenance events. For example, the operator may be informed to change the engine oil every 50 hours and may be informed to change the air filter every 100 hours.

The operator can reset the maintenance sensor 150 by depressing a reset button 214 (of FIG. 2) and if either light-emitting diode LED1 140 or LED2 144 is active (i.e., current flows to pin 5 or 7). Depressing the reset button 214 results in a reset signal being provided to the micro-controller 182. Upon receiving the reset signal, the software calculates a new time period value for the next scheduled maintenance. For example, if the counter is at 0111111111111111, if the time period for the next maintenance is at 50 hours, and if the counter increases every six seconds, then the next time period value will be 1111010100101111. Once the counter reaches the next time period value, an indication signal will be provided.

Preferably, the software will only calculate a new time period value (i.e., reset) after engine maintenance is recommended. That is, each time period value will be "locked-out" until a respective maintenance recommended state arises. For example, if neither indicator 140 or 144 is active, then no new time period value will be calculated. If both indicators 140, 144 are active, then both time period values will be recalculated. Even further, if only one indicator is active, then a new time period value will be calculated for that indicator only.

For the embodiment including the first and second sensing circuits S1, S2, the conditioned signal is also provided to sensors S1 and S2. If a low-oil pressure condition results, a current will flow through the third light-emitting diode LED3 206 and sensor S1 resulting in the activation of LED3 206. Similarly, if a high engine temperature condition results, a current will flow through the fourth light-emitting diode LED4 210 and sensor S2 resulting in the activation of LED4 210. Once LED3 206 or LED4 210 is activated, the operator is informed that engine maintenance is recommended (e.g., add oil).

In an alternative embodiment of the invention, rather than counting time, the maintenance sensor 150 can count the number of revolutions the magnet M completes. For example, as discussed above, the substantially DC signal generated by the rectifying circuit contains a DC offset with an AC ripple signal. The maintenance sensor 150 can include additional circuitry for conditioning the AC portion of the signal and the micro-controller 182 can increment a counter each time a ripple occurs. Of course, other methods can be used to calculate the number of revolutions for the engine 106.

In yet another alternative embodiment of the invention, rather than having the light-emitting diodes LED1 140 or LED2 144 be continuously active or lit in response to a particular maintenance recommended state, the diodes LED1 140 or LED2 144 may flash. For example, the first light-emitting diode LED1 140 may be active for a first period of time and then be inactive for a second period of time, where the active and inactive states repeatedly alternate until the reset button is depressed. The alternation of the active and inactive states is referred as periodic indication or flashing.

Even further, if the software records a maintenance recommended state for more than one recommended maintenance event (e.g., change engine oil and change air filter), then the micro-controller 182 may sequentially flash the first and second light-emitting diodes LED1 140 and LED2 144. That is, both the first and second light-emitting diodes LED1 140 and LED2 144 may be active for a first period of time (e.g., three seconds) and then be inactive for a second period of time (e.g., three seconds), where the first light-emitting diode 140 is active when the second light-emitting diode 144 is inactive and vice-versa. Sequentially flashing light-emitting diodes LED1 140 and LED2 144 helps reduce the amount of power required for continuously activating light-emitting diodes LED1 140 and LED2 144. Therefore, for situations where power may be a concern (e.g., where LED1 140 and LED2 144 are dim when both are lit at the same time), light-emitting diodes LED1 140 and LED2 144 may sequentially flash.

Figure 5:
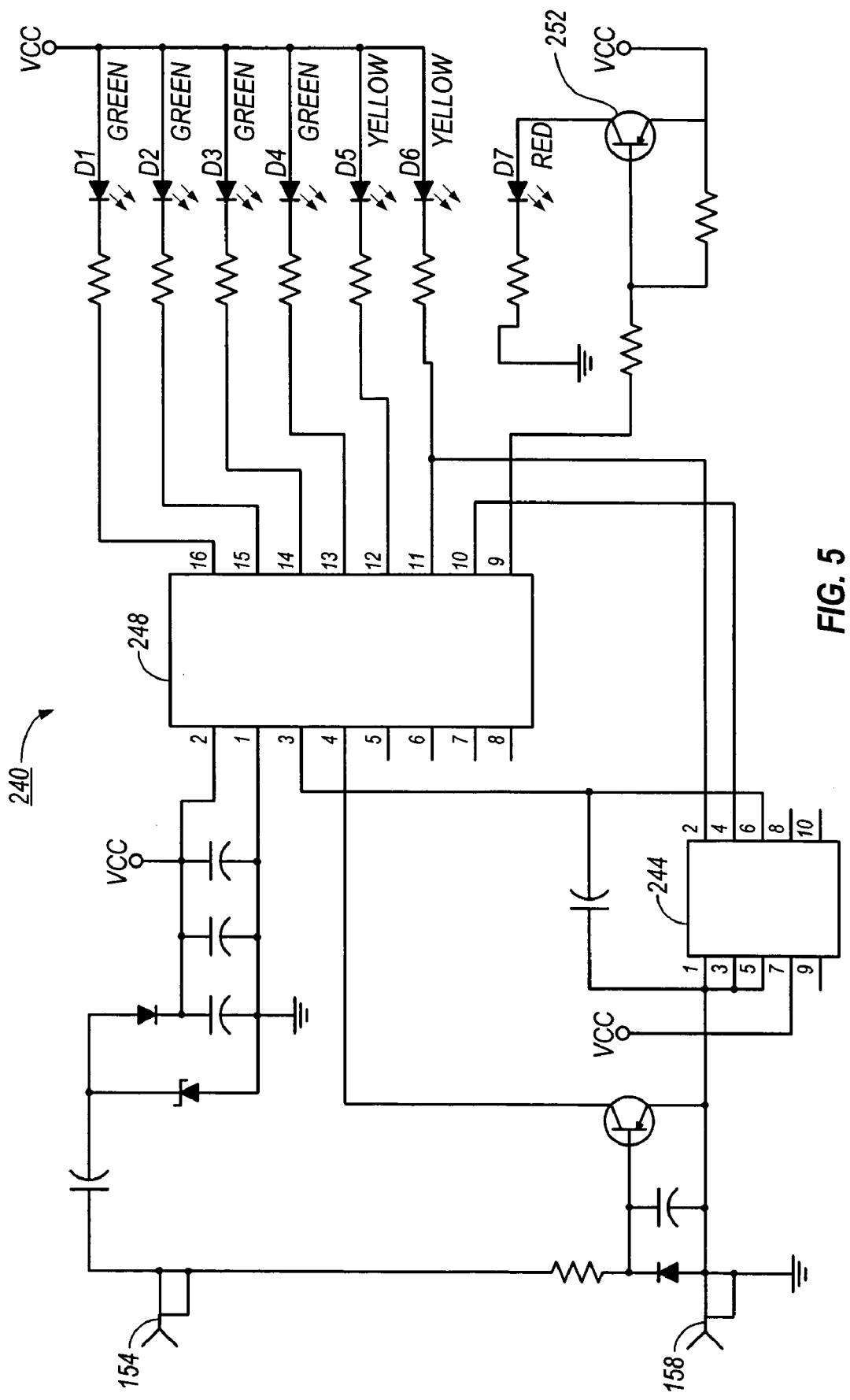
FIG. 5 shows an electrical schematic of a load indicator circuit of the load monitoring apparatus of FIG. 1 embodying the invention.

To determine the load power frequency, a different counting sensor circuit electrically coupled to the load monitoring apparatus 112 is used. FIG. 5 shows an embodiment of a load indicator sensor circuit 240, which is similar to the maintenance monitoring sensor 150 of FIG. 3. As in FIG. 3, the load indicator circuit 240 receives the winding signal through leads 154, 158. The signal is then conditioned via a series of voltage regulator, diodes, resistors, and capacitors. The conditioned signal is then fed to a micro-controller 248 for counting a frequency of the signal generated by the engine 106. The signal frequency is output at pins 9, 11–16, which then activate at least one of a set of discrete or discontinuous LED's. For example, if the signal frequency is higher than 61.5 Hz, an active low will be present at pin 16, and therefore, LED D1 is lit. If the signal frequency is between 57.5 Hz and 58.5 Hz, active lows will be present at pins 11–16, and thus, LED's D1–D5 are lit. If the signal frequency is below 56.5 Hz, active lows will be present at pins 9, 11–16. As a result, LED's D1–D6 are lit, a transistor 252 is activated, and LED D7 is lit, which indicates an engine overload condition. Further details of frequency counting are described hereinafter. In addition, although only the load indicator sensor circuit 240 is shown in FIG. 5, both the load indicator sensor circuit 240 and the maintenance monitoring sensor 150 can be configured to share the same circuitry because both circuits 150, 240 function as counters of generator signal frequency. Furthermore, the load indicator sensor circuit 240 also provides a JTAG connector 244 through which the micro-controller 248 can be programmed.

Figure 6:
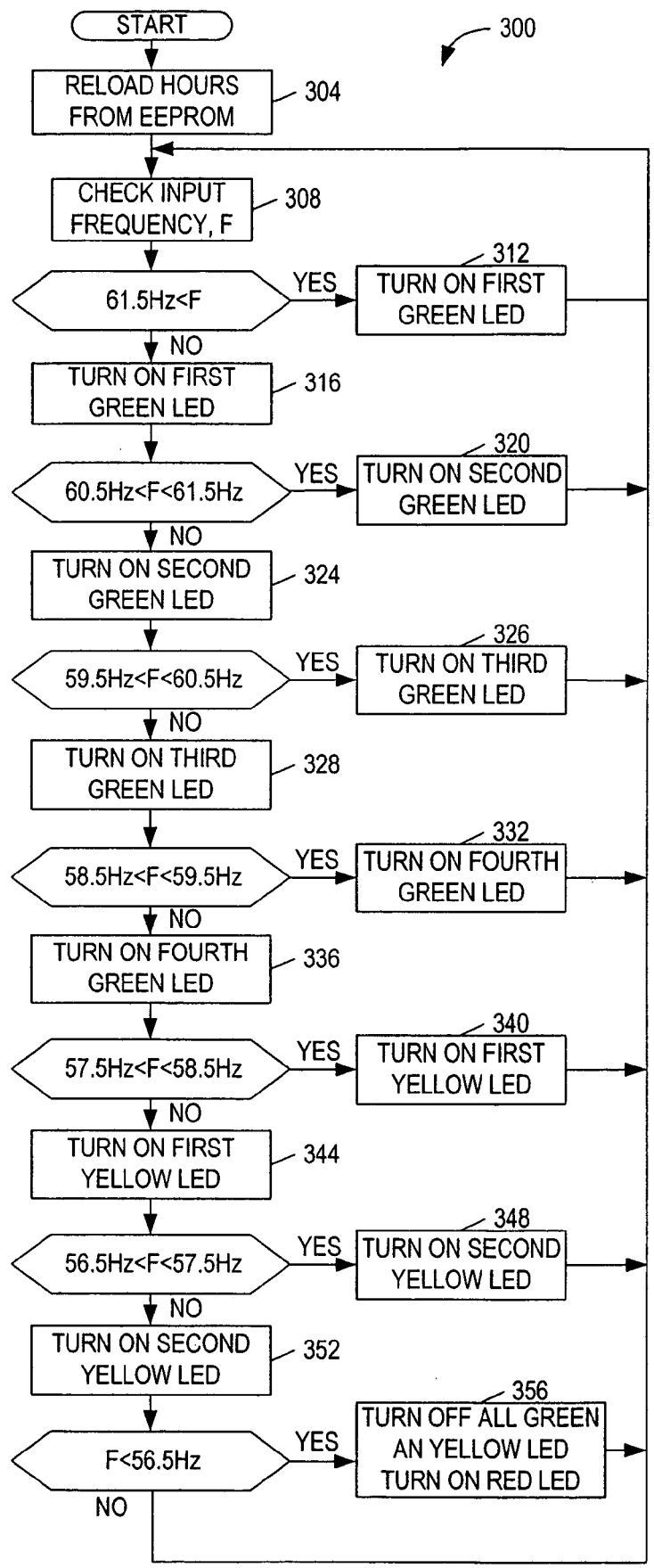
FIG. 6 shows a flow chart for lighting LED's of the load indicator circuit of the load monitoring apparatus of FIG. 2 according to the invention.

Once the micro-controller 248 receives the conditioned signal, the load power frequency is determined as illustrated in flow chart as shown in FIG. 6. Once a running hour of the generator 100 has been retrieved from the internal memory at block 304, a signal frequency is checked at block 308. If the signal frequency is at least 61.5 Hz, the first green LED 124a, D1 is lit at block 312, and block 308 is repeated. Otherwise, if the signal frequency is below 61.5 Hz, the first green LED 124a, D1 is also lit at block 316. If the signal frequency is between 60.5 Hz and 61.5 Hz, the second green LED 124b, D2 is lit at block 320, which discretely or discontinuous indicates about 20 percent of the generator capacity is being used, and block 308 is repeated.

If it is determined that the signal frequency is below 60.5 Hz, the second green LED 124b, D2 is also lit at block 324. However, the signal frequency is further examined as follows. If the signal frequency is between 59.5 Hz and 60.5 Hz which indicates about 40 percent of the generator capacity is being used, the third green LED 124c, D3 is lit at block 326, and block 308 is repeated. If the signal frequency is below 59.5 Hz, the third green LED 124c, D3 is also lit at block 328, and the signal frequency is further examined. When the signal frequency falls between 58.5 Hz and 59.5 Hz (which indicates about 60 percent of the generator capacity is being used), the fourth green LED 124d, D4 is lit at block 332, and block 308 is repeated. However, if the signal frequency falls below 58.5 Hz, the fourth green LED 124d, D4 is lit at block 336, and the signal frequency is examined again.

If the signal frequency is between 57.5 Hz and 58.5 Hz (which indicates about 80 percent of the generator capacity is being used), the first yellow LED 124e, D5 is lit at block 340, and block 308 is repeated. On the other hand, if the signal frequency falls below 57.5 Hz, the first yellow LED 124e, D5 is also lit at block 344, and the signal frequency is check again. If the signal frequency is between 56.5 Hz and 57.5Hz (which indicates about 100 percent of the generator capacity is being used), the second yellow LED 124f, D6 is lit at block 348, and block 308 is repeated. Otherwise, the second yellow LED 124f, D6 is also lit at block 352, but the signal frequency is subjected to examination again. If the signal frequency falls below 56.5 Hz, the generator 100 is overloaded, and the red LED 128, D7 is lit at block 356.

Figure 7:
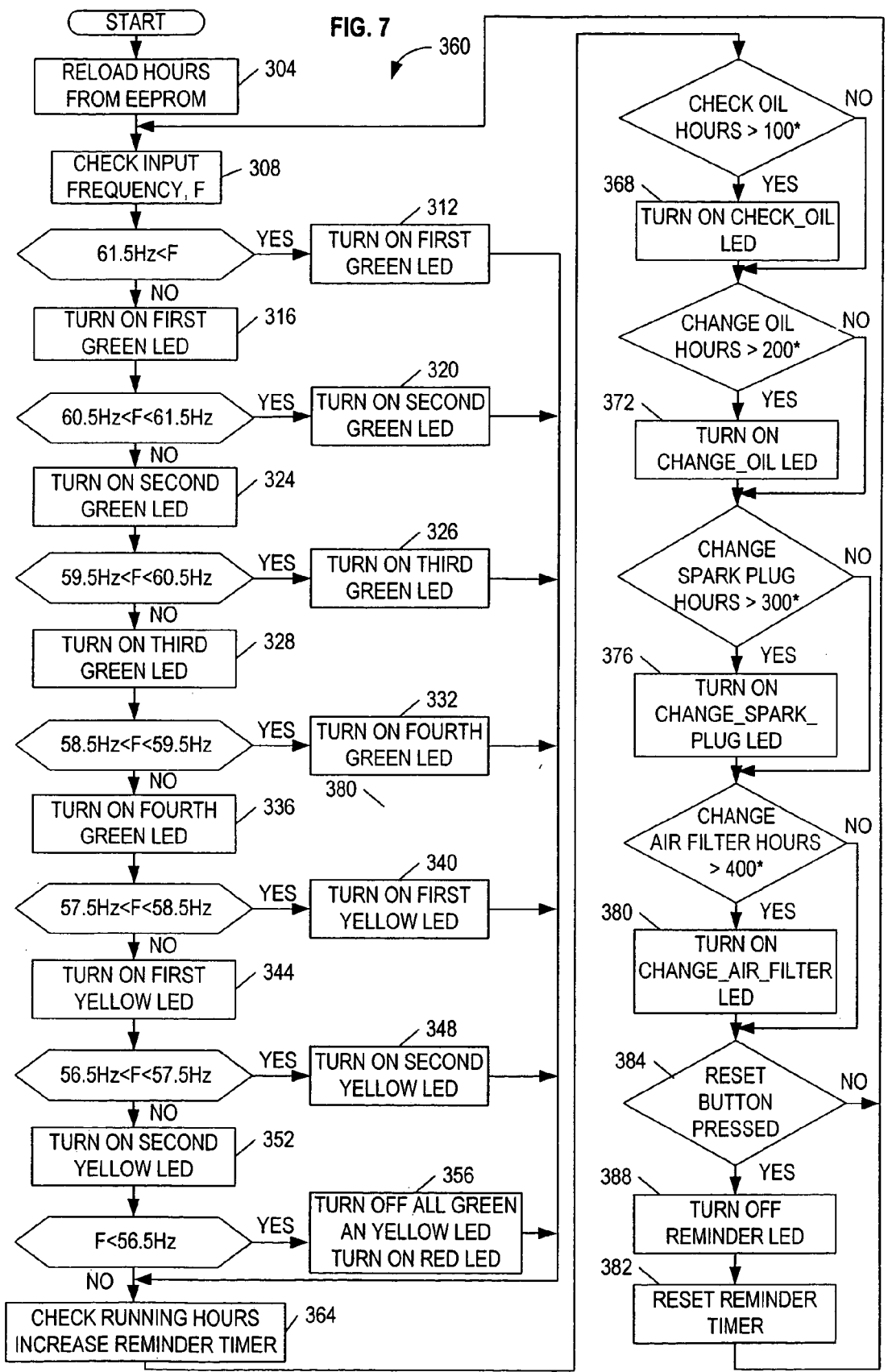
FIG. 7 shows a second flow chart for lighting LED's of the maintenance monitoring circuit and the load indicator circuit of the load monitoring apparatus of FIG. 2.

FIG. 7 shows a second flow chart 301 for the operation of an embodiment that includes the maintenance monitoring sensor 150 and the load indicator sensor circuit 240. Similar to FIG. 6, the second flow chart 360 shows that after any of the LED's has been lit (through block 356), the maintenance monitoring sensor 150 starts checking the total generator running time since the last reset from the internal memory at block 364. For example, if the running time is more than a predetermined number such as 100 hours, a check oil indicator is lit at block 368. If the running time is more than a predetermined number such as 200 hours, a change oil indicator is lit at block 372. Thereafter, for example, if the running time is more than a predetermined number such as 300 hours, a check spark plug indicator is lit at block 376. When the running time is more than a predetermined number such as 400 hours, a change air filter indicator is lit at block 380. However, if a reset button has been pressed at block 384, the reminder timer is turned off at block 388, and the reminder timer is also reset at block 392. The signal frequency is checked again at block 308.

Figure 8:
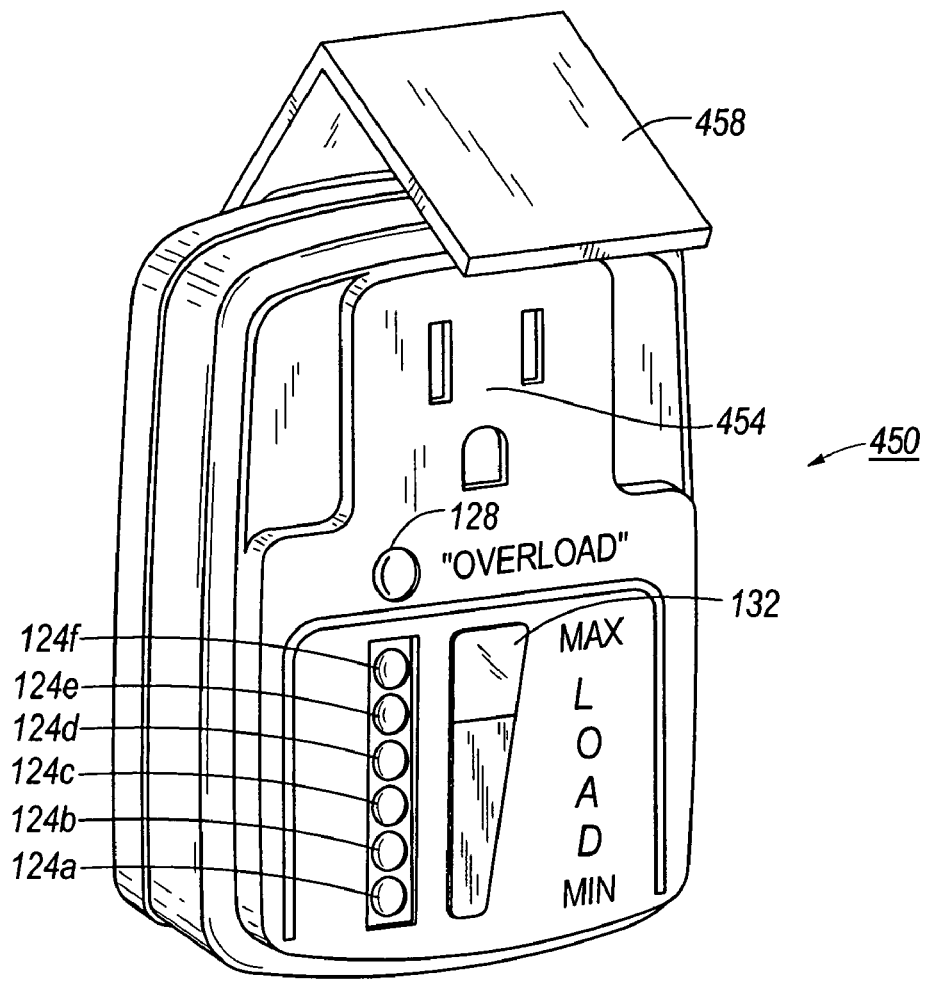
FIG. 8 shows a first detachable or modular load monitoring apparatus according to the invention.

Although the load monitoring apparatus 112 shown in FIGS. 1 and 2 is an integral part of the generator 100, a detachable load indicator having the load indicator sensor circuit 240 can also be used according to the invention. For example, FIG. 8 shows a detachable or a modular sensor 450 of the load monitoring apparatus 112 that only includes the load status indicator LED's 124a–124f, 128 as described earlier. Instead of coupling leads 154, 158 to the coil winding W1, the leads 154, 158 are adapted to be coupled to any power outlet of the generator 100. The detachable load sensor 450 also includes the overload LED 128, a male plug to connect to the generator 100 or any circuit using power from the generator 100, and a female receptacle 454 for connecting to any load. Thus, modular sensor 450 is connected in series with a load and, when so connected, can determine the sum total load applied to the generator 100 by sensing the generator output frequency or voltage. Operations and functions are similar to the embodiment where the apparatus 112 is integrated with the generator 100. However, the detachable sensor 450 has the flexibility to be connected to any open outlet of the generator 100, or any circuit that draws power from an attached generator. Furthermore, the detachable sensor 450 also includes an optional plug cover 458 that covers the receptacle 454 when the detachable sensor 450 is not in use.

Figure 9:
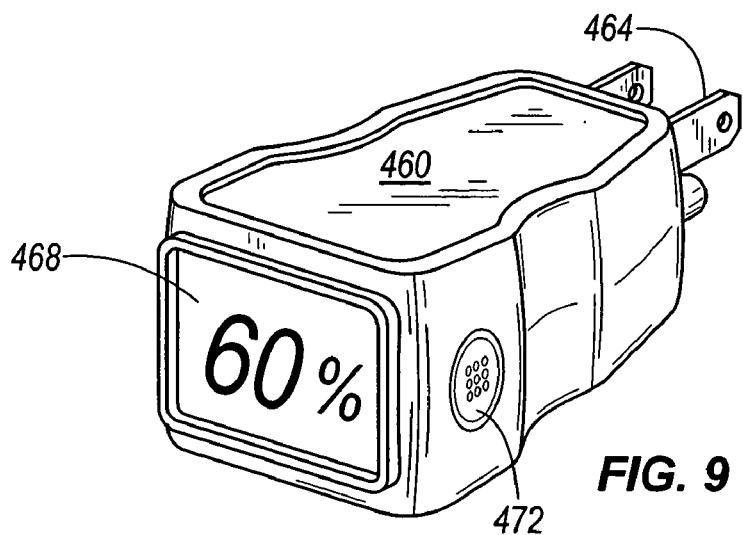
FIG. 9 shows a second modular load monitoring apparatus having an LCD display showing 60 percent applied load according to the invention.

FIG. 9 shows a second detachable sensor 460 according to the invention. The second detachable sensor 460 includes a male plug 464 to connect to the generator 100 or any circuit using power from the generator 100. However, the second detachable sensor 460 has a LCD display 468 that displays the load power frequency in terms of a percentage.

Figure 10:
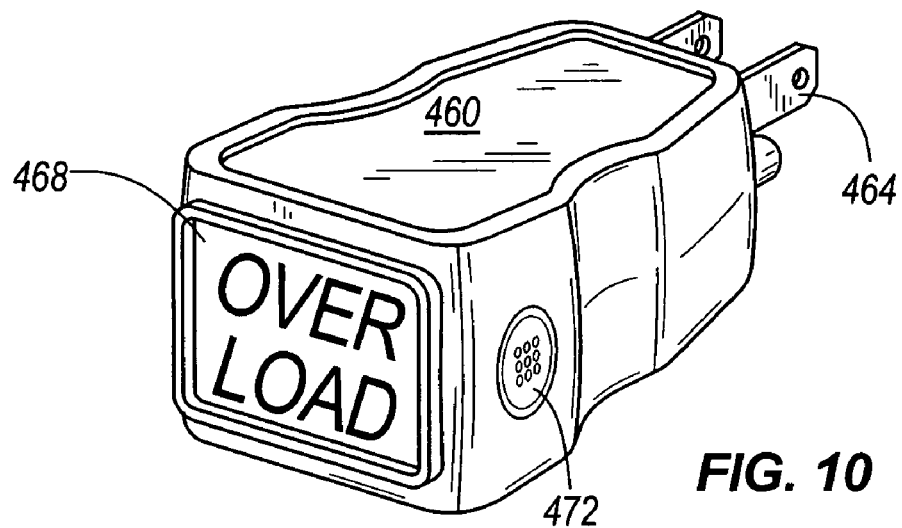
FIG. 10 shows the second modular load monitoring apparatus showing an overload condition according to the invention.

For example, FIG. 9 shows that the applied load only requires 60 percent of the maximum load capacity. Furthermore, the second detachable sensor 460 also includes an audible indicator 472 that generates a plurality of audible signals to indicate the generator capacity. For example, the audible indicator 472 generates a high pitched signal to indicate the engine 106 is overloaded. FIG. 10 shows that the applied load attempts to draw more power than the generator can supply, as in an overload condition. Unlike the first detachable sensor 450, the second detachable sensor 460 does not provide a receptacle to be connected to any load. The detachable or modular load monitoring sensors 450, 460 of FIGS. 8, 9, and 10, therefore, can be plugged into the generator 100, or into a building circuit that receives power from the generator 100 through a transfer switch.

Figure 11:
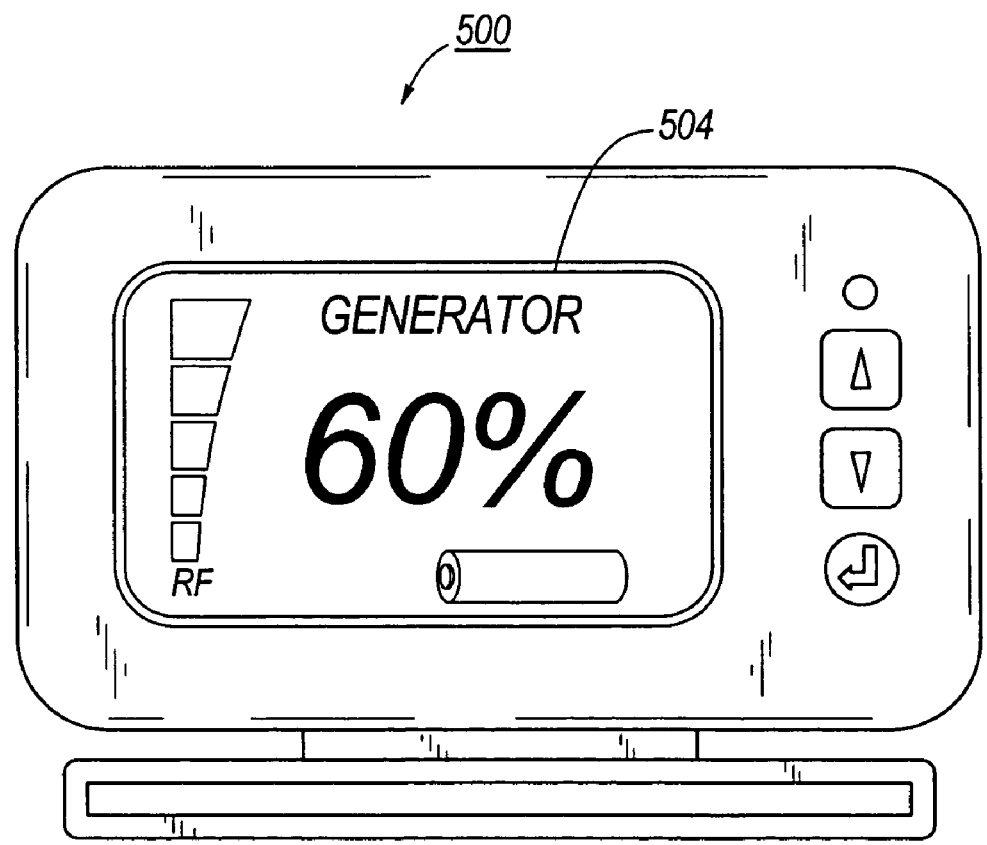
FIG. 11 shows a remote modular load monitoring apparatus having an LCD display showing 60 percent applied load according to the invention.

FIG. 11 shows a remote modular generator capacity sensor 500. The remote sensor 500 includes a liquid crystal display ("LCD") 504 is configured to display information such as generator capacity. In the embodiment, the generator 100 is running at 60 percent. Furthermore, the remote sensor 500 can communicate with the generator 100 via a connected wire, or via wireless communication. In the case of wireless communication, a wireless transmission module is implemented on the generator 100 to sense the load power frequency of the generator 100 and to wireless transmit the load power frequency to the remote sensor 500. The remote sensor 500, together with a receiver module internal or external to the remote sensor 500, converts the load power frequency into a generator capacity percentage as described earlier. The generator capacity percentage is thereafter displayed on the LCD 504. To indicate a transmission strength, the remote sensor 500 can also determine the transmission strength, and display the transmission strength on the LCD 504. An exemplary transmission type is radio frequency ("RF").

Various features and advantages of the invention are set forth in the following claims.

The invention claimed is:

1. A stand-alone detachable load monitoring module for use with a generator, wherein the generator is adapted to supply power to a load, the module comprising:
  a module housing;
  an electrical plug extending from the housing and adapted to be inserted into a power receptacle;
  a sensor in the housing, connected in circuit with the electrical plug, and adapted to sense a signal supplied to the load; and
  a humanly perceptible indicator interconnected with the housing and adapted to output at least one discontinuous humanly perceptible indication of the sensed signal supplied to the load.

2. The module of claim 1, further comprising an electrical outlet interconnected with the housing and adapted to supply power to the load.

3. The module of claim 1, wherein the humanly perceptible indicator comprises at least one of a liquid crystal display ("LCD"), a series of light emitting diodes ("LED"), and an audible indicator.

4. The module of claim 1, wherein the humanly perceptible indication indicates whether the signal supplied by the generator is sufficient to power the load.

5. The module of claim 1, wherein the sensor senses a frequency of the signal supplied to the load.

6. The module of claim 5, wherein the humanly perceptible indicator further indicates the signal supplied to the load is sufficient when the sensed frequency is higher than about 58.5 Hz, and the signal supplied to the load is insufficient when the sensed frequency is lower than about 56.5 Hz.

7. The module of claim 1, further comprising a plurality of LED's corresponding to a plurality of load magnitudes.

8. The module of claim 1, further comprising a cover adapted to cover a portion of the housing.

9. A method of monitoring power supplied from a generator to a load with a stand-alone detachable module having a housing, a sensor disposed in the housing, an electrical plug extending from the housing, and having a humanly perceptible indicator interconnected with the housing, the method comprising:
  inserting the electrical plug into a power receptacle;
  sensing at the sensor the power supplied from the generator to the load; and
  outputting at the humanly perceptible indicator at least one discontinuous humanly perceptible indication of the sensed power supplied to the load.

10. The method of claim 9, further comprising integrating an electrical outlet with the housing that is adapted to deliver the power to the load.

11. The method of claim 9, wherein the humanly perceptible indicator comprises at least one of a liquid crystal display ("LCD"), a series of light emitting diodes ("LED"), and an audible indicator.

12. The method of claim 9, further comprising indicating with the humanly perceptible indication whether power supplied by the generator is sufficient to power the load.

13. The method of claim 9, further comprising indicating with the humanly perceptible indicator that the power supplied to the load is sufficient to power the load when the frequency is higher than about 5 8.5 Hz, and the power supplied to the load is insufficient when the frequency is lower than about 56.5 Hz.

14. The method of claim 9, further comprising indicating a plurality of load magnitudes with a plurality of LED's.

15. The module of claim 1, wherein the power receptacle is positioned at the generator.

16. The module of claim 1, wherein the electrical plug comprises a three-prong plug.

17. The method of claim 9, wherein the electrical plug comprises a three-prong plug.

* * * * *